T. E. CONNELLY.
Fire-Extinguishers.

No. 196,563 — Patented Oct. 30, 1877.

Witnesses:
J. H. Connelly
C. L. Parker

Inventor:
Thomas Edward Connelly

UNITED STATES PATENT OFFICE.

THOMAS E. CONNELLY, OF NEW BRIGHTON, PENNSYLVANIA.

IMPROVEMENT IN FIRE-EXTINGUISHERS.

Specification forming part of Letters Patent No. 196,563, dated October 30, 1877; application filed September 4, 1877.

*To all whom it may concern:*

Be it known that I, THOMAS EDWARD CONNELLY, of New Brighton, county of Beaver, State of Pennsylvania, have invented or discovered a new and useful Improvement in Fire-Extinguishers; and I do hereby declare the following to be a full, clear, concise, and exact description thereof, reference being had to the accompanying drawing, making a part of this specification, in which—like letters indicating like parts—

Figure 1:
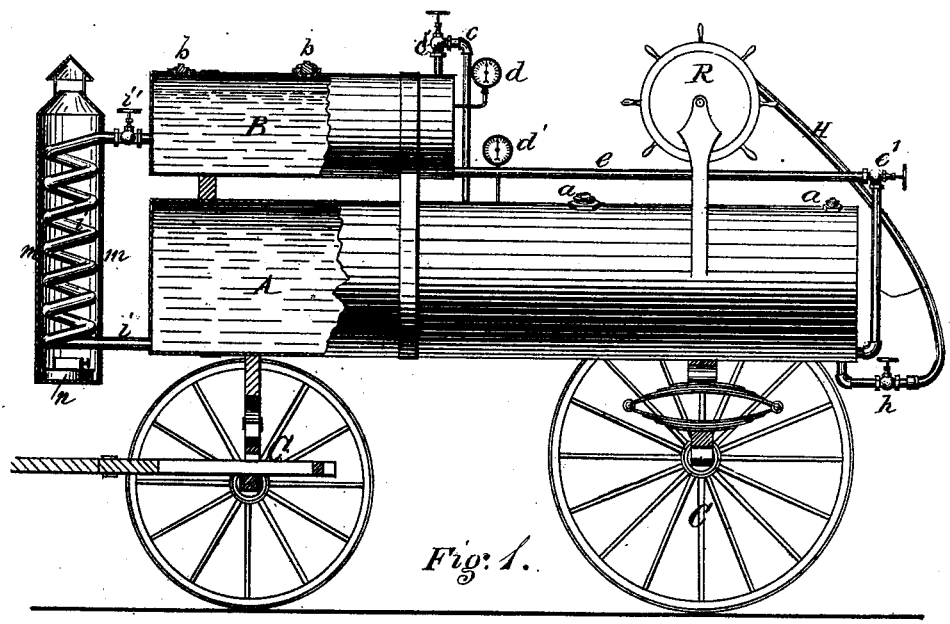
Figure 2:
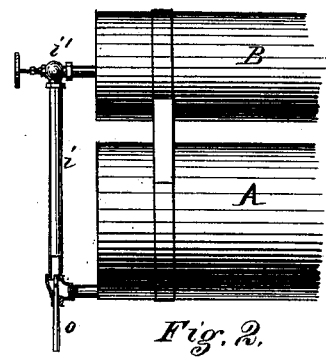

Figure 1 is a side elevation, partly in section, of my improved fire-extinguishing apparatus. Fig. 2 is a like view, showing one end of the receivers or chambers, with a connecting-pipe and a siphon or injector arranged to assist circulation; and Fig. 3 is a perspective view of my extinguisher, modified somewhat in form from that shown in Fig. 1, but constructed and operating in substantially the same manner.

My improved apparatus is designed for use in extinguishing fires by means of a mixture of carbonic-acid gas and water, and is also adapted for use as a generator, to generate the gas and mix the same with the water to be employed, the gas being produced from a mixture of certain chemical compounds, as hereinafter described.

Figure 3:
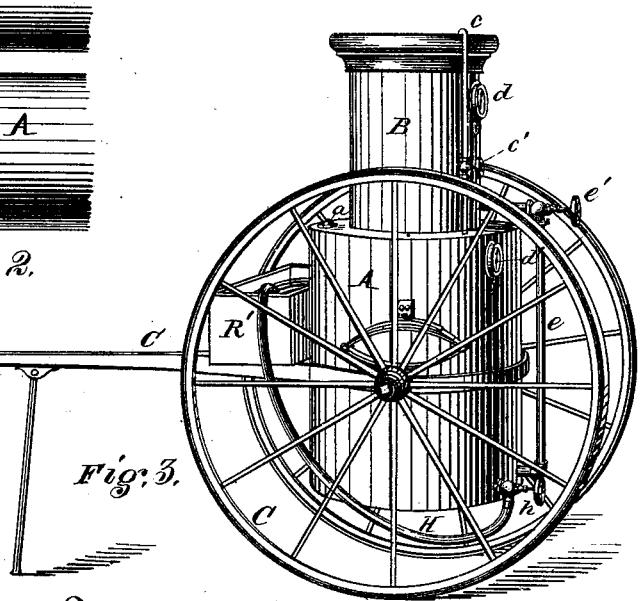

In the drawing, A represents a chamber or tank of any desired capacity, and B a similar tank or chamber, which is preferably somewhat smaller in size, and is arranged or placed over the tank A either longitudinally, as in Fig. 1, or vertically, as in Fig. 3, so that the contents of the chamber B may be drawn into the chamber A, if desired. I have shown these chambers as made of considerable capacity, and mounted on a cart or carriage, C. The apparatus may, however, be made stationary or lighter, so as to be transported by hand. Both these chambers A and B are made tight as against pressure from within, and they are also made without openings or communication with each other, except through pipes, as hereinafter described. Openings $b\ b$, one or more in number, are provided in the chamber B, through which the chamber may be charged. These openings are secured by packed screw-caps, so as to prevent leakage. Similar charging-openings $a\ a$ are also provided in the chamber A. Pressure-gages $d\ d'$ are, by preference, arranged with the chambers to indicate the pressure within.

A pipe, $c$, with stop-cock $c'$ therein, connects the top of the chamber B with the top of the chamber A; also, a pipe, $e$, with cock $e'$, connects the same chambers at the bottom.

H is the discharge-hose, which may be wound on a reel, R, or coiled in a convenient box, R', Fig. 3. The discharge is controlled by a cock, $h$.

In Fig. 1, $i$ is a pipe connecting the two chambers, as shown, and is provided with a stop-cock, $i'$. This pipe $i$ is, by preference, coiled as shown, so as to present considerable surface to some heating-flame, which may be had either from a lamp, $n$, placed in the base of the inclosing-case $m$, or from any convenient source. The object in view in heating the pipe is to induce a circulation, when desired, between the two chambers.

Fig. 2 shows this pipe $i$ straight, the coils being omitted. In this case circulation is established by means of a steam-jet forced into the pipe through the injector or siphon $o$, which is arranged to enter the pipe at any convenient point.

In charging my apparatus for use, I prefer to make use of compounds for generating gas described and claimed in the application for patent of J. H. Connelly, filed August 3, 1877—namely, granulated bicarbonate of soda and porous sulphate of alumina. Other compounds may be used, however, which, when mixed, will generate the required gas.

The stop-cocks in the pipes which connect the two chambers being closed, the upper chamber B is filled with water, or so nearly filled that, upon the addition of the requisite carbonate of soda or other compound, the chamber shall be full. The chamber A is also supplied with water to such an amount that when the sulphate of alumina or other compound is added, the chamber shall be nearly but not quite full.

The contents of these two chambers may then be mixed in either of the two following ways, and, first, intermixture may be made through the pipes $c$ and $e$ alone, for if the cocks $c'$ and $e'$ be opened, a part of the contents of the chamber B will flow through the pipe $e$ to the chamber A, and a corresponding volume of air in the top of the chamber A will pass through the pipe c to the chamber B. I prefer, then, to close the cocks c' e' for a time.

As already mentioned, the chamber B contains a solution of bicarbonate of soda, and a portion of this being passed to the chamber A, as described, and mixing with the solution of sulphate of alumina in this chamber A, carbonic-acid gas will be generated, which will place the contents of this chamber under pressure, as will be indicated by the gage $d'$. On again opening the cock $e'$, this pressure will force a part of the contents of A into B, when gas will, in turn, be generated in this chamber B, and an excess of pressure obtained there.

In this manner the operation may be continued until a continuous circulation is established, and the contents of the two chambers have become thoroughly intermingled and the full capacity of gas generated.

A second method of causing circulation is by means of the pipe $i$ and one or both of the pipes $c$ $e$. Heat being applied to the pipe $i$, as already described, a movement will take place in its contents, and the cock $i'$ being opened, such movement will result in mixing a portion of the contents of the two chambers. As this is done gas will be generated, and an unequal pressure obtained in the chambers, which, by a proper manipulation of the cocks in the connecting-pipes, may be caused to assist in completing a mixture of the contents.

The third method is illustrated in Fig. 2, where an injector or steam-jet is arranged in the pipe $i$. By forcing steam into the pipe, and one or both the pipes $c$ $e$ being opened, the desired circulation may be established in substantially the same manner as before described.

I consider the last two methods preferable to the first, especially when expedition is required, as by warming somewhat the contents of the chambers the generation of gas is facilitated, and, especially in the last method, the presence of steam assists in acquiring and maintaining the desired pressure.

The chambers A and B being filled with their respective solutions, as described, they may, if desired, be kept in that condition till required for use; but I prefer, on charging the chambers, to generate gas and secure the requisite pressure at once, as the apparatus is then ready for use at any moment; and it is not particularly difficult to make the apparatus tight, so as to preserve the pressure any desired length of time. If, however, from any cause, the pressure should be lost, the gages $d$ and $d'$ will indicate the loss, when the apparatus may be refitted, and thus kept in good working order.

Whatever compounds are used for generating the required gas, I prefer to use them in sufficient quantity to secure a pressure of about one hundred and fifty pounds to the square inch. On opening the cock $h$, the mingled gas and water in the chambers may be directed by the hose H to the desired point. One great advantage arising from my improved apparatus is the circulation which I thereby obtain between the chambers holding the different solutions. By means of this circulation a uniform and thorough mixture is obtained, and the greatest possible amount of gas obtained from a given amount of chemical compounds.

I claim herein as my invention—

1. In a fire-extinguishing apparatus, the combination of chambers A and B, connecting-pipes $c$ and $e$, and cocks $c'$ and $e'$, substantially as described, whereby the contents of the two chambers may be intermixed by means of a circulation established through the connecting-pipes.

2. The combination of closed chambers A and B, having two or more connecting-pipes with stop-cocks therein, and a device for artificially creating a current in one of the connecting-pipes, substantially as and for the purpose set forth.

In testimony whereof I have hereunto set my hand.

THOMAS EDWARD CONNELLY.

Witnesses:
J. J. McCormick,
J. H. Connelly.